United States Patent
Grammer et al.

(10) Patent No.: US 12,044,323 B2
(45) Date of Patent: Jul. 23, 2024

(54) VALVE ASSEMBLY WITH PRELOADED CONTROL OIL RETURN

(71) Applicant: Robert Bosch GmbH, Stuttgart (DE)

(72) Inventors: Markus Grammer, Ludwigsburg (DE); Steffen Knapper, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 18/059,560

(22) Filed: Nov. 29, 2022

(65) Prior Publication Data

US 2023/0175601 A1  Jun. 8, 2023

(30) Foreign Application Priority Data

Dec. 2, 2021 (DE) ...................... 10 2021 213 691.5

(51) Int. Cl.
*F15B 13/04* (2006.01)
*F15B 13/01* (2006.01)
(Continued)

(52) U.S. Cl.
CPC ........ *F16K 15/1826* (2021.08); *F15B 13/015* (2013.01); *F15B 13/0435* (2013.01);
(Continued)

(58) Field of Classification Search
CPC .. F16K 15/1826; F15B 13/015; F15B 20/005; F15B 13/0435; F15B 2013/0409;
(Continued)

(56) References Cited

U.S. PATENT DOCUMENTS

| 4,153,075 A * | 5/1979 | Budzich | .............. F15B 13/0417 |
| | | | 137/596.13 |
| 2011/0017321 A1* | 1/2011 | Kunz | .................... F15B 13/015 |
| | | | 137/487.5 |

(Continued)

FOREIGN PATENT DOCUMENTS

| DE | 10 2019 204 246 A1 | 10/2020 |
| EP | 2 280 179 B1 | 2/2011 |

OTHER PUBLICATIONS

"Differentialtransformator", https://de.wikipedia.org/wiki/Differentialtransformator, Apr. 22, 2020, (German and English language document) (5 pages).

*Primary Examiner* — Kelsey E Cary
(74) *Attorney, Agent, or Firm* — Maginot, Moore & Beck LLP

(57) ABSTRACT

A valve assembly includes a linearly moving main slider, a pilot valve, a control oil inlet, and a control oil return. The pilot valve is designed as a 4/3 proportional directional valve, via which a first end face and an opposite second end face of the main slider can be fluidly connected selectively to the control oil inlet or the control oil return so that the main slider (20) is hydraulically movable by adjusting the pilot valve. The pilot valve is electrically adjustable depending on a target current. A position sensor is provided, with which an actual position of the main slider can be measured. A positioner is provided, with which the actual position can be regulated by adjusting the target current to a predefinable target position. The pilot valve is connected to the control oil return via a check valve. The check valve only permits fluid flow from the pilot valve toward the control oil return. The check valve is preloaded to a closed position by means of a first spring so that it opens at a predetermined opening pressure. The leakages at the pilot valve from the control oil inlet toward the check valve are designed to be so large that (Continued)

if the pressure at the control oil inlet exceeds the opening pressure by at least 2 bar, the opening pressure of the check valve is present immediately upstream of the check valve.

4 Claims, 2 Drawing Sheets

(51) Int. Cl.
*F15B 13/043* (2006.01)
*F15B 20/00* (2006.01)
*F16K 15/18* (2006.01)

(52) U.S. Cl.
CPC .... *F15B 20/005* (2013.01); *F15B 2013/0409* (2013.01); *F15B 2211/30525* (2013.01); *F15B 2211/5156* (2013.01)

(58) Field of Classification Search
CPC .. F15B 2211/20546; F15B 2211/30505; F15B 2211/3144; F15B 2211/329; F15B 2211/355; F15B 2211/5156; F15B 13/0433; F15B 2211/30525; F15B 2211/67
See application file for complete search history.

(56) References Cited

U.S. PATENT DOCUMENTS

| | | | |
|---|---|---|---|
| 2015/0361995 A1* | 12/2015 | Joung | E02F 9/2228 60/413 |
| 2017/0059047 A1* | 3/2017 | Luthi | F16K 15/1826 |
| 2019/0302812 A1* | 10/2019 | Knapper | G05D 16/166 |
| 2020/0309162 A1* | 10/2020 | Nemes | H01F 27/28 |

\* cited by examiner

VALVE ASSEMBLY WITH PRELOADED CONTROL OIL RETURN

This application claims priority under 35 U.S.C. § 119 to patent application no. DE 10 2021 213 691.5, filed on Dec. 2, 2021 in Germany, the disclosure of which is incorporated herein by reference in its entirety.

The disclosure relates to a valve assembly, to a valve block comprising a plurality of such valve assemblies, and to a vehicle comprising such a valve assembly or such a valve block.

BACKGROUND

A valve disk is known from EP 2 280 179 B1, wherein a plurality of such valve disks can be assembled to form a valve block. The valve disk has a linearly moving main slider, which can be hydraulically moved by means of a pilot valve. Furthermore provided is a position sensor, with which the position of the main slider can be measured.

A pilot assembly that is provided for use with a comparable valve disk is known from DE 10 2019 204 246 A1. The corresponding pilot valve is associated with a control oil inlet and a control oil return, which is formed separately from the hydraulic supply of the main slider.

Furthermore, it is known that such valve disks have a positioner whose control variable is the adjustment of the pilot valve and whose actual value is provided by the position sensor.

The protruding valve disk is often used in vehicles, e.g., in agricultural tractors. Such vehicles have various hydraulic consumers, each having their own control oil supply. In this case, different supply pressures may be required in the different control oil inlets so that the different hydraulic consumers respectively function properly. The different supply pressures have so far been respectively provided with a separate pressure regulating device.

SUMMARY

An advantage of the valve assembly according to the disclosure is that it can be operated at a supply pressure that is higher than is necessary for proper function, in particular proper function of the position control itself. In this case, it is easily possible to adapt the valve assembly to the supply pressure used in the associated vehicle by another hydraulic consumer. The check valve proposed according to the disclosure has a very simple construction, in particular simpler than an alternatively considered pressure reduction valve in the control oil inlet.

According to the disclosure, it is proposed that the pilot valve is connected to the control oil return via a check valve, wherein the check valve only permits fluid flow from the pilot valve toward the control oil return, wherein the check valve is preloaded to a closed position by means of a first spring so that it opens at a predetermined opening pressure, wherein the leakages at the pilot valve from the control oil inlet toward the check valve are designed to be so large that if the pressure at the control oil inlet exceeds the opening pressure by at least 2 bar, the opening pressure of the check valve is present immediately upstream of the check valve. In the context of the disclosure, any existing leakages at the pilot valve are thus utilized to keep the check valve open in a defined manner even if the pilot valve is in its zero position, in which theoretically no volumetric flow flows from the control oil inlet to the control oil return. Thus, even in the zero position, the mentioned opening pressure is permanently present in the control oil return. When hydraulically adjusting the main slider, only the difference between the pressure in the control oil inlet and the mentioned opening pressure is effective. This pressure difference may be designed by appropriately designing the preloading of the first spring such that the position control functions optimally no matter what pressure is applied in the control oil inlet, to the extent that said pressure only exceeds a predetermined minimum pressure.

The mentioned leakage flow is preferably permanently present if the mentioned pressure ratios are present, wherein said leakage flow in particular cannot be blocked by valves or the like. In the present case, a check valve is understood to mean a valve that only allows fluid flow to pass in one direction and blocks fluid flow in the opposite direction. The check valve is preferably designed as a seat valve, wherein the relevant valve body is most preferably a ball.

Advantageous developments and improvements of the disclosure are specified below.

It may be provided that the pressure at the control oil inlet can be regulated to a predetermined supply pressure by means of a pressure regulating device. The pressure regulating device may be designed such that its control variable is the displacement volume of a variable displacement pump and its actual value is the discharge pressure of the pump. Alternatively, the pressure regulating device may comprise a continuously adjustable orifice in the control oil inlet, which orifice is exposed to the pressure downstream of the orifice in the closing direction and pressurized by a preloaded spring in the opening direction.

The disclosure also relates to a valve block comprising a plurality of valve assemblies according to the disclosure, wherein all valve assemblies have a common control oil inlet and a common control oil return, to which all pilot valves are respectively connected in parallel, wherein a single common check valve toward the common control oil return is provided. The valve block preferably comprises a plurality of separate valve disks, each comprising an associated main slider, an associated pilot valve, an associated position sensor, and an associated positioner.

The disclosure furthermore relates to a vehicle comprising a hydraulic auxiliary unit and a valve assembly according to the disclosure or a valve block according to the disclosure, wherein the hydraulic auxiliary unit can be supplied with pressurized fluid via the control oil inlet of the valve assembly or the common control oil inlet of the valve block. The auxiliary unit may be a transmission with a hydraulically adjustable transmission ratio, an electro-hydraulically switchable clutch, a vehicle suspension with a hydraulically adjustable ground clearance, or a working hydraulics system not supplied by the valve assembly or the valve block.

It is understood that the aforementioned features and the features yet to be explained below can be used not only in the respectively specified combination but also in other combinations or alone, without leaving the scope of the present disclosure.

DETAILED DESCRIPTION OF THE DRAWINGS

The disclosure is explained in more detail below with reference to the enclosed drawings in which.

DETAILED DESCRIPTION

Figure 1:
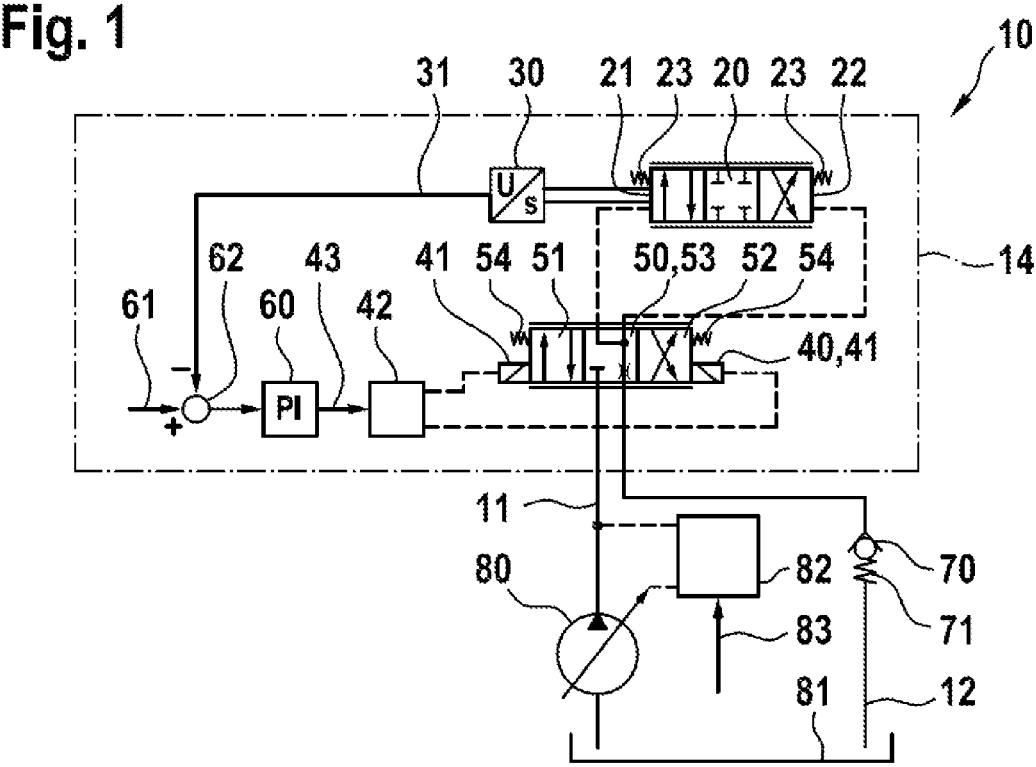
FIG. 1 shows a diagram of a valve assembly according to the disclosure.

FIG. 1 shows a diagram of a valve assembly 10 according to the disclosure. The part of the valve assembly 10 framed by a dot-dashed line is designed such that it can be formed by a valve disk 14, wherein a plurality of valve disks can be assembled to form a valve block (No. 13 in FIG. 2). A linearly moving main slider 20 is provided within the valve disk 14 and is shown, purely by way of example, as a 4/3 proportional directional valve. The main slider 20 may have any number of switch positions and connections. In the context of the disclosure, it is important that the position of the main slider 20 can be measured by a position sensor 30, wherein the position of the main slider 20 is hydraulically adjustable by means of a pilot valve 50. The corresponding pilot control is preferably designed in accordance with DE 10 2019 204 246 A1, the entire content of which is referenced and made part of the content of the present application. Accordingly, the position sensor 30 operates according to the principle of the differential transformer (https://de.wikipedia.org/wiki/Differentialtransformator). The pilot valve 50 is a 4/3 proportional directional valve preloaded to a center zero position 53 by at least one third spring 54. In the zero position 53, a negative zero overlap is preferably given, wherein the first and the opposite second end faces 21; 22 of the main slider 20 are respectively connected via a narrow throttle to the control oil return 12. In the first control position 51, the first end face 21 of the main slider 20 is connected to the control oil inlet 11 and the second end face 22 of the main slider 20 is connected to the control oil return 12. In the second control position 52, the control oil inlet 11 is connected to the second end face 22 of the main slider 20 and the first end face 21 of the main slider 20 is connected to the control oil return 12.

Associated with the pilot valve 50 is a flow control device 42, with which the position of the pilot valve 50 can be electrically adjusted. The flow control device 42 comprises two electromagnets 41 whose magnetic forces act in opposite directions on the pilot valve 50. The current in the electromagnets 41 is preferably adjusted using pulse width modulation, i.e., the preferably constant supply voltage is switched on and off in quick succession. In so doing, a corresponding duty cycle, namely, the ratio of the time duration switched on to the total duration of an on-off cycle, is preferably adjusted in order to adjust the average current in the relevant electromagnet 41. The duty cycle is preferably used as a control variable of a current control circuit (not shown), the target value of which is the target current 43. However, the duty cycle may also be directly used as the target current 43 so that the current in the electromagnets is adjusted in a controlled manner.

Furthermore provided is a positioner 60, with which the position of the main slider 20 can be regulated to a predefinable target position 61. In addition to the target position 61, the actual position 31 of the main slider 20 measured by the position sensor 30 is included in the corresponding target-actual comparison 62. The positioner 60 is in the present case designed as a PI controller, wherein other continuous linear controllers but also fuzzy controllers etc. can be used. The control variable of the positioner 60 is the target current 43 already addressed. It is conceivable that a pilot control (not shown) may be superposed on the position control shown, wherein the target current of the pilot control is preferably added to the target current of the position control with the correct sign. It should be noted here that the target current 43 can assume positive or negative values, wherein the sign determines which of the two electromagnets 41 is energized.

The adjustment of the positioner 60, namely, the adjustment of the gain and the adjustment of the lag time of the PI controller, is inter alia dependent on the pressure in the control oil inlet 11. The pressure in the control oil inlet 11 is therefore typically regulated with a pressure regulating device 82 to a predetermined supply pressure 83, wherein the positioner is adjusted for this pressure value such that the actual position 31 reaches the target position 61 as quickly as possible and with a low error, wherein no instability occurs, in particular no oscillating actual value 31.

In the present case, the control oil inlet 11 is supplied by an adjustable displacement pump 80, e.g., an axial piston pump in a swashplate design. The pressure regulating device 82 adjusts the mentioned displacement volume, preferably such that the pressure in the control oil inlet 11 is equal to the predetermined supply pressure 83. It is understood that other pressure regulating principles can be used, wherein a pressure balance may, for example, be used.

The present valve assembly is preferably used in a vehicle, e.g., in an agricultural tractor, wherein the position of the lifting unit or of the front loader is hydraulically adjusted by means of the main slider 20. In such a vehicle, there are further hydraulic functions that also require a separate control oil supply, for example a transmission whose transmission ratio is hydraulically adjustable, a vehicle suspension in which the ground clearance of the vehicle is hydraulically adjustable, or a hydraulically actuatable clutch on a power take-off shaft of the vehicle. This presents the problem that these components are provided by different manufacturers, wherein the pressures required in the control oil inlet are different. Usually, a separate pressure regulating device is associated with each of these uses.

With the check valve 70 according to the disclosure, it can be achieved in a cost-efficient manner that the supply pressure 83 at the pressure regulating device 82 can be designed for a different hydraulic consumer than the valve assembly 10. It is sufficient for the supply pressure 83 to be higher than the pressure actually required for optimal position control. Adaptation to the pressure level required for position control is achieved by selecting the preloading of the first spring 71, which preloads the check valve 70 to the closed position. The inventors have recognized that only the pressure difference between the pressure in the control oil inlet 11 and the pressure in the control oil return 12 is of importance for the adjustment of the present position control. Whether the pressure in tank 81 as usual or a pressure increased relative to tank 81 is applied in the control oil return 12 has substantially no impact on the adjustment of the positioner.

A check valve 70 in the context of the present application is understood to mean a valve that only allows fluid flow to pass in one direction, preferably at a very low resistance. In contrast, fluid flow in the opposite direction is blocked. The check valve 70 is preferably arranged in the path toward the tank 81 such that a single common check valve 70 can be used for all valve disks 14 of a valve block 13.

Figure 2:
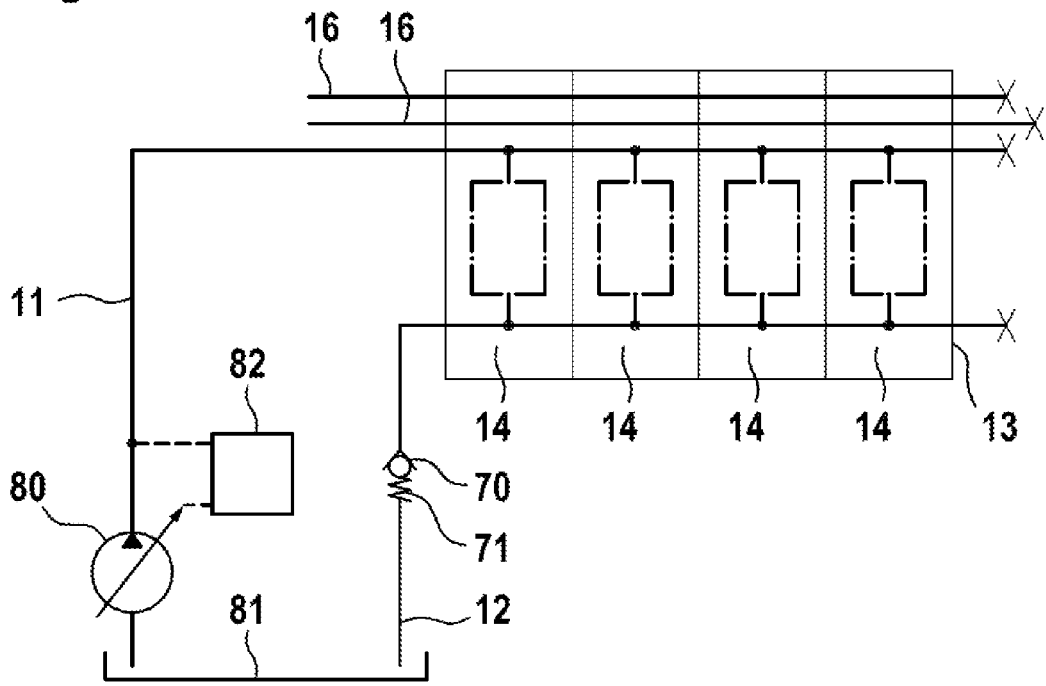
FIG. 2 shows a diagram of a valve block comprising a plurality of valve assemblies according to FIG. 1.

FIG. 2 shows a diagram of a valve block comprising a plurality of valve assemblies according to FIG. 1. The pump 80, pressure regulating device 82, check valve 70, and tank 81 are identical to the corresponding components in FIG. 1 so that reference is made in this respect to the embodiment of FIG. 1. In contrast to FIG. 1, a plurality of valve disks 14 are connected in parallel to the control oil inlet 11. The control oil inlet 11 is formed by a line that passes through all valve disks 14, wherein the line is closed in a fluid-tight manner at the end facing away from the pump 80. The components framed with a dot-dashed line in FIG. 1 are provided in FIG. 2 several times at the locations respectively marked with a dot-dashed line. The control oil return 12 is tapped in parallel by the individual valve disks 14 and is jointly conducted via a single, common check valve 70 before flowing into the tank 81. Thus, the opening pressure of the check valve 70 is applied on the return side in all valve disks 14.

The further common lines 16 of the valve block 13, which pass through all valve disks 14, should also be pointed out. These are in particular a working inlet and a working return, which is respectively connected in parallel to the various main sliders in order to supply the actual hydraulic working function.

Figure 3:
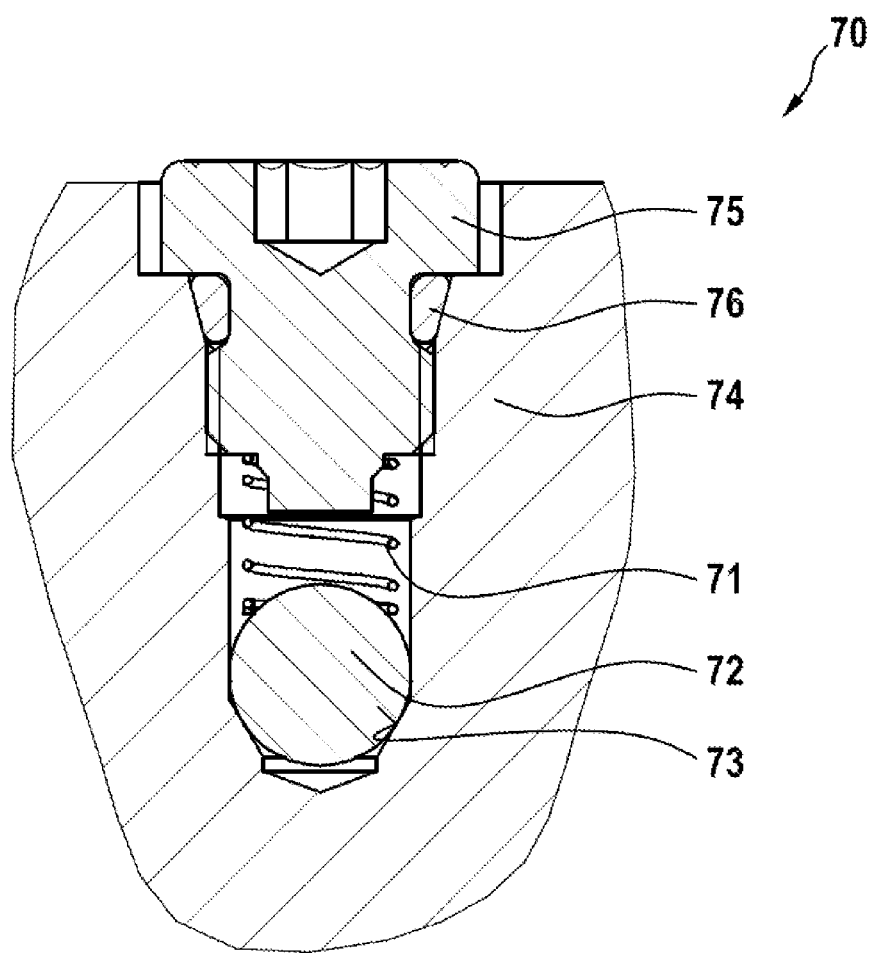
FIG. 3 shows a cross section of a check valve according to the disclosure.

FIG. 3 shows a cross section of a check valve 70 according to the disclosure. The check valve 70 is designed as a seat valve, wherein the corresponding valve body 72 is formed by a steel ball. The associated valve seat 73 is designed in the form of a circular cone and is preferably arranged directly on a housing 74. The housing 74 may, for example, be formed by a separate connecting disk of the valve block (No. 13 in FIG. 2). The first spring 71 is installed preloaded between the valve body 72 and a locking screw 75. The locking screw 75 is screwed into the housing 74, wherein the corresponding screw connection is sealed in a fluid-tight manner with a separate seal 76. The tank (No. 81 in FIG. 1) is connected to the space in which the first spring 71 is accommodated. The leakages explained above flow from the opposite side of the valve seat 73.

REFERENCE NUMBERS

- 10 Valve assembly
- 11 Control oil inlet
- 12 Control oil return
- 13 Valve block
- 14 Valve disk
- 16 Other common line
- 20 Main slider
- 21 First end face
- 22 Second end face
- 23 Second spring
- 30 Position sensor
- 31 Actual position
- 40 Electromagnetic actuation device
- 41 Electromagnet
- 42 Flow control device
- 43 Target current
- 50 Pilot valve
- 51 First control position
- 52 Second control position
- 53 Zero position
- 54 Third spring
- 60 Positioner
- 61 Target position
- 62 Target-actual comparison
- 70 Check valve
- 71 First spring
- 72 Valve body
- 73 Valve seat
- 74 Housing
- 75 Locking screw
- 76 Seal
- 80 Pump
- 81 Tank
- 82 Pressure regulating device
- 83 Supply pressure

What is claimed is:

1. A valve assembly, comprising:
a linearly moving main slider having a first end face and an opposite second end face;
a pilot valve which is electrically adjustable depending on a target current;
a control oil inlet;
a control oil return, wherein the pilot valve is designed as a 4/3 proportional directional valve via which the first end face and the opposite second end face of the main slider is fluidly connected selectively to the control oil inlet or the control oil return so that the main slider is hydraulically movable by adjusting the pilot valve;
a position sensor configured to measure an actual position of the main slider; and
a positioner configured to regulate the actual position by adjusting the target current to a predefinable target position,
wherein the pilot valve is connected to the control oil return via a check valve,
wherein the check valve is configured to only permit fluid flow from the pilot valve toward the control oil return,
wherein the check valve is preloaded to a closed position by way of a first spring so that it opens at a predetermined opening pressure, and
wherein the leakages at the pilot valve from the control oil inlet toward the check valve are designed to be so large that if the pressure at the control oil inlet exceeds the opening pressure by at least 2 bar, the opening pressure of the check valve is present immediately upstream of the check valve.

2. The valve assembly according to claim 1, further comprising a pressure regulating device configured to regulate the pressure at the control oil inlet to a predetermined supply pressure.

3. A valve block, comprising:
a plurality of valve assemblies according to claim 1, wherein all of the plurality of valve assemblies have a common control oil inlet and a common control oil return to which all pilot valves are respectively connected in parallel, and
a single common check valve toward the common control oil return.

4. A vehicle, comprising:
a hydraulic auxiliary unit; and
a valve assembly according to claim 1,
wherein the hydraulic auxiliary unit is configured to be supplied with pressurized fluid via the control oil inlet of the valve assembly or the common control oil inlet of the valve block.

\* \* \* \* \*